United States Patent [19]

Yeo

[11] Patent Number: 4,918,287
[45] Date of Patent: Apr. 17, 1990

[54] APPARATUS AND METHOD FOR PRODUCING MULTI-LEVEL HEAT INPUT FOR WELD FORMATION USING A SINGLE CURRENT LEVEL POWER SUPPLY

[75] Inventor: Denis Yeo, Columbia, S.C.

[73] Assignee: Westinghouse Electric Corp., Pittsburgh, Pa.

[21] Appl. No.: 312,283

[22] Filed: Feb. 21, 1989

[51] Int. Cl.⁴ .............................................. B23K 9/16
[52] U.S. Cl. .................. 219/137 PS; 219/74; 219/125.11
[58] Field of Search ............... 219/74, 125.11, 137 R, 219/137 PS

[56] References Cited

U.S. PATENT DOCUMENTS

| 3,484,575 | 12/1969 | Cunningham | 219/74 |
| 3,683,148 | 5/1972 | Boyko et al. | 219/137 R |
| 3,725,635 | 2/1973 | Fink et al. | 219/121 P |
| 3,842,238 | 1/1974 | Boyko et al. | 219/137 |
| 3,988,566 | 11/1976 | Vogts et al. | 219/12 |
| 4,003,788 | 3/1977 | Boyko et al. | 176/79 |
| 4,075,454 | 4/1978 | Duncan et al. | 219/137 R |
| 4,139,758 | 2/1979 | Pinfold | 219/74 |
| 4,154,999 | 1/1979 | Pinfold et al. | 219/72 |
| 4,410,788 | 11/1983 | Summers et al. | 219/130.1 |
| 4,529,863 | 5/1985 | Lebel | 219/137.42 |
| 4,749,841 | 7/1988 | Galantino et al. | 219/137 PS |

FOREIGN PATENT DOCUMENTS 548396  4/1977  U.S.S.R. .................. 219/74

OTHER PUBLICATIONS

Publication "Apparatus for Welding Chemically Active High Melting Metals in a controlled Atmosphere of Super Pure Helium" by S. M. Gurevich et al., pp. 45–47, 1970.

Primary Examiner—Clifford C. Shaw

[57] ABSTRACT

An apparatus and method produces multi-level heat input for nuclear fuel rod weld formation using a single current level power supply. Different levels of electrical power are produced to achieve a low heat, high heat sequence by imposition of a sequence of inert atmospheric cover gases of different ionization energies at the welding site to regulate voltage drop and thereby electrical power level and heat input level for arc welding of the nuclear fuel rod to take place. A first cover gas, such as argon, is supplied to the weld chamber in a first welding pass for producing a high electrical current level and low heat input level, whereas a second cover gas, such as helium or a mixture of helium and argon, is supplied to the weld chamber in a second welding pass for producing low electrical current level and high heat input level. The first cover gas has a lower ionization energy than the second cover gas which results in a lower voltage drop and lower heat input during the first pass compared to the second pass so that the desired sequence of low heat first pass and high heat second pass is achieved.

11 Claims, 1 Drawing Sheet

APPARATUS AND METHOD FOR PRODUCING MULTI-LEVEL HEAT INPUT FOR WELD FORMATION USING A SINGLE CURRENT LEVEL POWER SUPPLY

BACKGROUND OF THE INVENTION

1. Field of the Invention

The present invention relates generally to fuel rods for a nuclear reactor and, more particularly, is concerned with an apparatus and method for producing multi-level heat input for nuclear fuel rod weld formation using a single current level power supply.

2. Description of the Prior Art

A nuclear reactor core is composed of a multiplicity of fuel assemblies with each fuel assembly comprised of a plurality of nuclear fuel rods. A typical nuclear fuel rod is manufactured by loading a plurality of nuclear fuel pellets and a plenum spring into a cladding tube and applying bottom and top end plugs to opposite ends of the cladding tube. Typically, the end plugs are welded to the ends of the tube in an atmosphere of inert gas which provides a suitable shield or cover gas for performance of arc welding. Argon, helium, and a helium-argon mixture are examples of suitable cover gases, with helium ordinarily being the preferred cover gas. Conventional welding operations performed in the manufacture of nuclear fuel rods are disclosed in U.S. Patents to Boyko et al (3,683,148), Fink et al (3,725,635), Boyko et al (3,842,238 and 4,003,788) and Duncan et al (4,075,454).

Arc welding of end plugs to the tube ends must be carried out with care and precision to avoid various types of weld defects, such as cracking, porosity, distortion of the tube adjacent to the inner extension of the end plug, and a reduction in the thickness of the tube adjacent to the weld, commonly referred to as I.D. undercutting. For reducing the frequency of the I.D. undercutting weld defect, a low heat first pass and high heat second pass technique has been used. This technique has required welding at different electrical current levels to achieve the desired sequence of multi-level heat input. For this reason, a welding electrical energy source or power supply has been used which is capable of supplying current at the different levels to accomplish the low heat/high heat sequence. However, the requirement for such power supply has contributed to the high cost and complexity of controlling operation of this technique with the resultant overall difficulty in forming welds with reduced defects.

Consequently, a need exists for improvements in the low heat first past/high heat second pass technique to reduce or overcome these shortcomings.

SUMMARY OF THE INVENTION

The present invention provides a multi-level heat input producing apparatus and method designed to satisfy the aforementioned needs. The improvement introduced by the present invention over the prior art permits achievement of the low heat, high heat sequence without the requirement for a welding electrical energy source or power supply capable of supplying electrical current at different levels in sequence. The improvement of the present invention does not retain the use of different levels of current to achieve the low heat, high heat sequence but generates the desired power levels by imposition of a sequence of atmospheric cover gases of different ionization energies to regulate voltage drop and thereby power level and heat input level at the welding site for arc welding of the nuclear fuel rod to take place. By ionization energy is meant the minimum energy required to remove an electron from an atom of the gas to form an ion of the gas. Since the power dissipated in the weld arc is a function of the voltage drop across the arc multiplied by the current flowing through the arc, changes in power, and therefore heat input, can be achieved by changing the voltage and keeping the current level constant as well as by keeping voltage constant and changing the current level.

Accordingly, the present invention is set forth in combination with a welding chamber and a touch for welding a workpiece in the chamber by employing a first welding pass lower heat input and second welding pass higher heat input for weld formation at a weld site in the chamber. The present invention is directed to an apparatus for producing multi-level heat input which comprises: (a) an electrical energy source connected between the welding torch and the workpiece for producing only a single level of electrical current; (b) a plurality of separate gas sources for supplying first and second cover gases of different ionization energies; and (c) means connected in flow communication between the gas sources and the welding chamber and being operable for regulating the flows of the first and second cover gases to the welding chamber to convert the single current level into a sequence of different power levels to achieve the first welding pass lower heat input and second welding pass higher heat input sequence.

The present invention is also directed to a method for producing the multi-level heat input, comprising the steps of: (a) connecting an electrical energy source between the welding torch and the workpiece for producing only a single level of electrical current; (b) supplying first and second cover gases of different ionization energies; and (c) regulating the flows of the first and second cover gases to the welding chamber to convert the single current level into a sequence of different power levels to achieve the first welding pass lower heat input and second welding pass higher heat input sequence.

More particularly, the first cover gas used in the first welding pass for producing lower heat input has an ionization energy of lower magnitude than the second cover gas used in the second welding pass for producing higher heat input. The cover gases are preferably inert gases. By way of example, the first cover gas can be argon and the second cover gas can be helium or a mixture of helium and argon.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
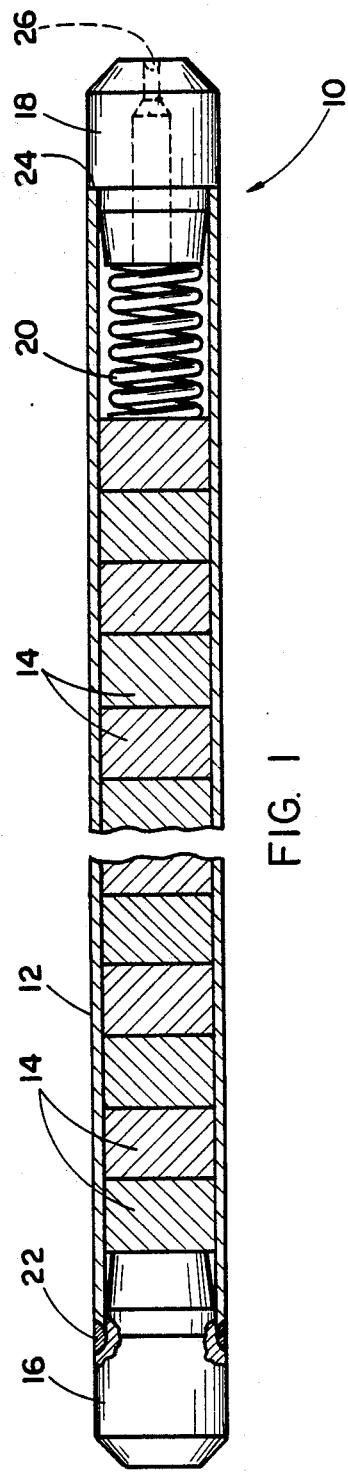
FIG. 1 is a longitudinally foreshortened, axial sectional view of a prior art fuel rod.

In the following description, like reference characters designate like or corresponding parts throughout the several views of the drawings. Also in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is shown a prior art nuclear fuel rod, in foreshortened form and generally designated 10, to which the welding system employing the improvement of the present invention can be applied. The fuel rod 10 includes a cladding tube 12, a plurality of nuclear fuel pellets 14 in the tube 12, and bottom and top end plugs 16, 18 applied to opposite ends of the tube. Also, to maintain the pellets 14 in an end-to-end stack form in the tube, a plenum spring 20 is disposed in the tube between the pellet stack and top end plug 18.

In assembling the fuel rod 10, typically the bottom end plug 16 is applied and girth welded at 22 to one end of the tube 12 first. Then, the pellets 14 and spring 20 are loaded through the remaining open end of the tube 12. The top end plug 18 is applied last and ordinarily both girth and end seal welded at 24 and 26 respectively to close and seal the fuel rod. An atmosphere of a suitable shield or cover gas, ordinarily an inert gas, is employed during performance of arc welding of the end plugs 16,18.

Multi-Level Heat Input Production

Figure 2:
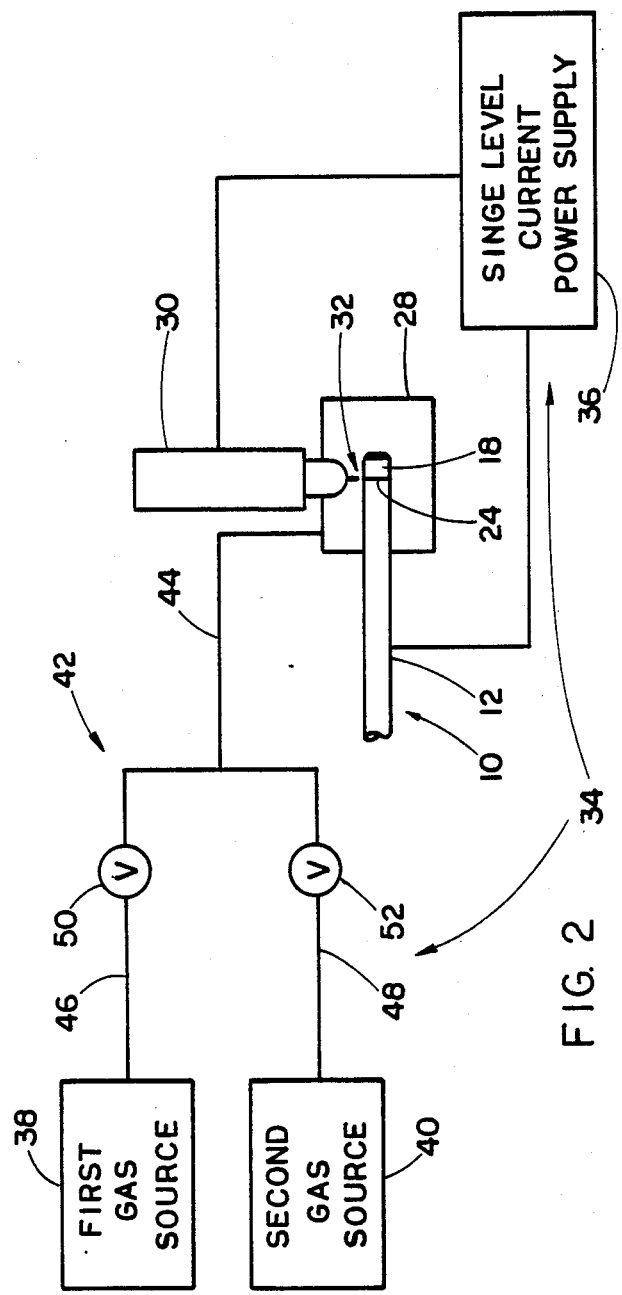
FIG. 2 is a schematical view of a prior art apparatus for welding an end plug to a cladding tube of the fuel rod in conjunction with a schematical view of a multi-level heat input producing apparatus of the present invention.

Turning now to FIG. 2, there is schematically depicted a welding chamber 28 and a welding torch 30 of a conventional welding system for performing welding of the end plug 18 to the cladding tube 12. Heretofore, the welding system has employed a multi-level current electrical energy source or power supply (not shown) for generating different levels of electrical current for producing a conventional sequence of a lower heat input first welding pass followed by a higher heat input second welding pass for accomplishing weld formation at a weld site, generally designated 32. During each welding pass, the fuel rod 10 is rotated about its longitudinal axis one or more times. The weld site 32 in the chamber 28 is defined by a butt joint between the upper end plug 18 and one end of the cladding tube 12. Also, an inert gas, such as argon, helium or a helium-argon mixture, was typically used to provide the atmosphere of cover gas, with helium ordinarily being preferred.

The improvement of the present invention does not retain the use of different levels of current to achieve the lower heat, higher heat welding sequence but generates the desired power levels by a different approach than before. In accordance with the principles of the present invention, the different power levels are provided by imposition in the welding chamber 28 of a sequence of atmospheric cover gases of different ionization energies to regulate voltage drop and thereby current level and heat input level at the welding site 32 for arc welding of the nuclear fuel rod 10 to take place. By ionization energy is meant the minimum energy required to remove an electron from an atom of the gas to form an ion of the gas.

As depicted schematically in FIG. 2, an apparatus, generally designated 34, is incorporated by the welding system in conjunction with the welding chamber 28 and welding torch 30 for producing multi-level heat input in order to accomplish arc welding by the conventional sequence of the lower heat input first, or initial, welding pass followed by the higher heat input second, or final, welding pass. The apparatus 34 includes an electrical energy source or power supply 36 connected between the welding torch 30 and the workpiece or fuel rod tube 12 in place of the multi-level current producing power supply used heretofore. The power supply 36 is operated to produce only a single level of electrical current.

The apparatus 34 also includes a plurality of separate gas sources 38, 40 and control means 42 connected in flow communication between the gas sources 38, 40 and the welding chamber 28. The separate gas sources 38, 40 are for supplying first and second cover gases of different ionization energies to the welding chamber 28. The control means 42 includes a main conduit 44 connected to the chamber 28 and a pair of branch conduits 46, 48 connected in parallel relation to one another and in flow communication with the main conduit 44 and the respective gas sources 38, 40. A pair of control valves 50, 52 are interposed in the respective branch conduits 46, 48 and are operable for regulating the respective flows of the first and second cover gases to the welding chamber 28. It should be understood although the main conduit 44 is shown connected directly to the welding chamber 28, it can be connected indirectly to the chamber 28 via the welding torch 30.

The sequence in which the cover gases are supplied to the welding chamber 28 accomplishes conversion of the single current level produced by the power supply 36 into a sequence of different power levels to achieve the conventional sequence of the first welding pass at lower heat input and second welding pass at higher heat input. More particularly, the upper control valve 50 is opened initially to supply the first cover gas used in the first welding pass. The first cover gas from the source 38 has an ionization energy of lower magnitude than the second cover gas for producing lower heat input at the weld site 32. Then, after lapse of the desired period of time, the upper control valve 50 is closed and the lower control valve 52, which was closed earlier, is now opened to supply the second cover gas used in the second welding pass. The second cover gas from the source 40 has an ionization energy of higher magnitude than the first cover gas for producing higher heat input at the weld site 32. Alternatively, the two separate control valves 50, 52 could be replaced by a single three-way or four-way valve which functions equivalently.

More particularly, in accordance with the improvement of the present invention, preferably, the first and second cover gases are inert gases. By way of example, the first cover gas can be argon and the second cover gas can be helium or a mixture of helium and argon. Alternatively, it is possible for both cover gases to be mixtures of argon and helium, however, with the first gas mixture having a substantially greater proportion of argon than helium and the second gas mixture just the opposite.

The improvement of the present invention applies the known scientific fact that the ionization energies of gases in a given family or column of the periodic table, such as the inert gases, tend to decrease as their atomic numbers increase. Thus, the argon gas which has a higher atomic number than the helium gas, has a lower ionization energy. The lower ionization energy of argon compared to helium translates to a lower voltage drop with argon than with helium. The lower voltage drop with argon thereby produces less heat at the weld site 32 during the first welding pass than with helium during the second welding pass so that the desired sequence of low heat first pass and high heat second pass is achieved.

The benefits and advantages of the improvement are (1) achievement of low heat first pass, high heat second pass without an expensive programmer required, (2) better arc starting with pure argon, (3) better visual weld quality from improved arc starting, (4) longer life of torch electrode, and (5) lower gas costs.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

I claim:

1. In combination with a welding chamber and a torch for welding a workpiece in said chamber by employing a lower heat input first welding pass and higher heat input second welding pass for weld information at a weld site in said chamber, a method for producing multi-level heat input, comprising the steps of:
   (a) operating an electrical energy source connected between the welding torch and the workpiece to produce only a single level of electrical current;
   (b) supplying first and second cover gases of different ionization energies; and
   (c) regulating the flows of said first and second cover gases to the welding chamber to convert the single current level into a sequence of different power levels to achieve the sequence of the first welding pass at lower heat input and second welding pass at higher heat input.

2. The method as recited in claim 1, wherein said first and second cover gases are inert gases.

3. The method as recited in claim 1, wherein said first cover gas is argon.

4. The method as recited in claim 1, wherein said second cover gas is helium.

5. The method as recited in claim 1, wherein said second cover gas is a mixture of argon an helium.

6. The method as recited in claim 1, wherein said regulating the flow of said cover gases is performed by operating separate control valves.

7. The method as recited in claim 1, wherein said first cover gas used in the first welding pass for producing lower heat input has an ionization energy of lower magnitude than said second cover gas used in the second welding pass for producing higher heat input.

8. The method as recited in claim 7, wherein said first and second cover gases are inert gases.

9. The method as recited in claim 8, wherein said first cover gas is argon.

10. The method as recited in claim 9, wherein said second cover gas is helium.

11. The method as recited in claim 9, wherein said second cover gas is a mixture of argon and helium.

* * * * *